T. S. LEESE.
AERATING CHURN.
APPLICATION FILED MAY 27, 1910.

984,144.

Patented Feb. 14, 1911.

Witnesses:
Chas. S. Lipley.
Henry Sens.

Inventor:
Thaddeus S. Leese
by C. M. Clarke
his Attorney

UNITED STATES PATENT OFFICE.

THADDEUS S. LEESE, OF AVALON, PENNSYLVANIA.

AERATING-CHURN.

984,144.  Specification of Letters Patent.  Patented Feb. 14, 1911.

Application filed May 27, 1910. Serial No. 563,737.

*To all whom it may concern:*

Be it known that I, THADDEUS S. LEESE, a citizen of the United States, residing at Avalon, in the county of Allegheny and State of Pennsylvania, have invented certain new and useful Improvements in Aerating-Churns, of which the following is a specification, reference being had therein to the accompanying drawing.

My invention relates to the class of aerating churns and consists of an improved construction adapted to induce a current of air upwardly through a hollow central conduit and downwardly through surrounding operating dasher mechanism, with actuating means therefor, etc., as shall be more fully hereinafter described.

Figure 1:
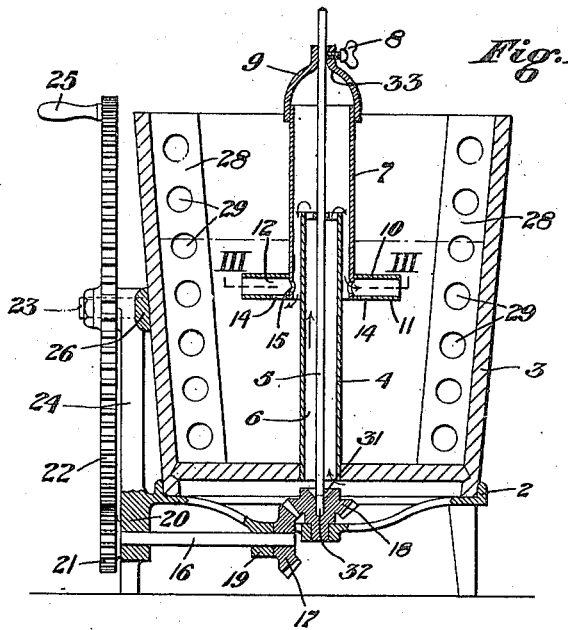
Figure 2:
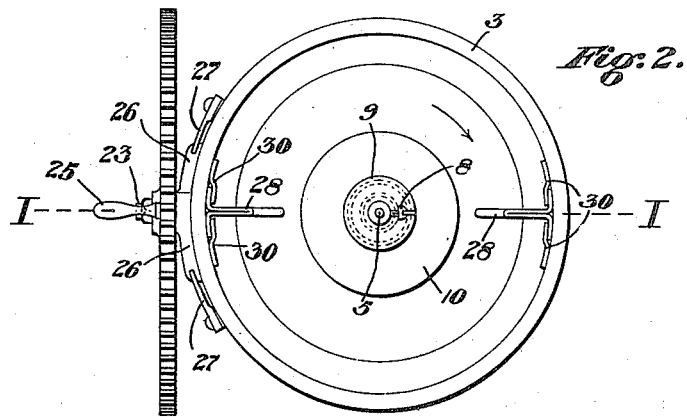
Figure 3:
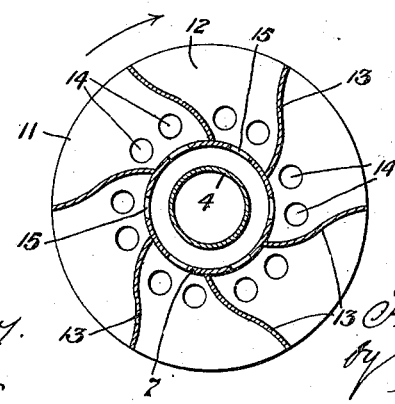

Referring to the drawings:—Figure 1 is a central vertical section through the churn on the line I. I. of Fig. 2. Fig. 2 is a plan view of the churn. Fig. 3 is an enlarged horizontal sectional view on the line III. III. of Fig. 1.

In the drawings, 2 represents a supporting base of any suitable construction, preferably having an annular flange for reception of the bottom of the tub or vessel 3, which may be open at the top or provided with a suitable cover as preferred. Said tub is of any desired capacity, and extending upwardly through the bottom centrally thereof is a cylindrical tube 4 of ample size to receive the central rotating spindle of shaft 5 and with intervening space 6 for passage of the air, as indicated by the arrows. Said tube 4 terminates at a suitable height within the interior of the tub 3 as shown.

7 is an outer cylindrical sleeve or tube concentrically and rotatably mounted around tube 4 and spindle 5, with ample air circulation space between tube 4 and shell 7, adjustably secured to spindle 5 by set screw 8 extending through the hub of the coping 9 at the upper end of the tube 7. The lower end of the sleeve 7 is provided with rotatable dasher mechanism consisting, in the construction shown, of upper and lower disks 10, 11, respectively, with an intervening space 12 and divided at intervals by radially disposed partition walls 13 as more clearly shown in Fig. 3. Said walls 13 are preferably curved or inclined as indicated, so that when the dasher mechanism is rotated, the cream will be thrown radially outward by the walls due to their action and centrifugal motion, while also being carried around in the general direction of the dasher within the tub 3.

The lower disk 11 is provided with apertures 14 upwardly through which the cream will pass to the spaces 12, while the lower end of tube 7 between disks 10 and 11 is also apertured as indicated at 15, for outward travel of the air.

For the purpose of rotating spindle 5 and the superimposed dasher mechanism secured to it, I provide a shaft 16, bevels 17 and 18 secured to said shaft and the lower end of spindle 5 respectively, and intermeshing with each other, shaft 16 being mounted in suitable bearings 19 and 20 of the base 2. The outer end of shaft 16 is provided with a pinion 21 into which meshes gear 22 rotatably mounted on stud 23 extending outwardly from standard 24. The gear 22 is provided with a handle 25. By said gearing it will be seen that the spindle 5 and the dasher mechanism may be rotated at high speed.

For the purpose of easy assemblage of the parts, the upwardly extending hub of gear 18 is inwardly tapered as at 31 and provided with a square socket to receive the squared terminal 32 of spindle 5, whereby the spindle may be removed and readily replaced. For the same purpose the inner upper end of coping 9 is similarly tapered as at 33, to centralize the coping and spindle.

The upper end of standard 24 may, if desired, be widened as indicated at 26, to provide a substantial bearing for the side of the tub, to which the tub may be secured if desired, by suitable latches 27 of any desired construction.

For the purpose of providing interfering or baffling members for the cream, one or more inwardly projecting flanges or walls 28 may be provided, if desired, preferably having perforating apertures 29, said baffles being slidingly mounted in retaining keepers or flanges 30 as clearly shown.

The operation of the churn will be readily understood from the foregoing description. Cream may be charged into the tub to any desired height as indicated by the dotted line Fig. 1, and the dasher mechanism lowered to a point about 1½ inches below the surface and fixedly secured on spindle 5 by set screw 8. Rotation of the spindle through the gearing will agitate the cream, diverting it outwardly in all directions by operation of the dasher walls 13, such centrifugal motion inducing a current of air inwardly through the bottom of tube 4 as described, which air will be thoroughly diffused and commingled with the cream, thereby aerating it.

The apparatus as a whole is extremely simple in construction, easily taken apart for cleaning, and is composed of few parts and not liable to get out of order.

Having described my invention, what I claim is:—

1. In a churn, a vessel provided with an air inlet tube extending upwardly through its bottom and a rotatable dasher in telescoping arrangement with the upper portion of said tube, and means for rotating said dasher.

2. In a churn, a vessel provided with an air inlet tube extending upwardly through its bottom and a rotatable dasher in telescoping arrangement with the upper portion of said tube, a supporting spindle for the dasher extending upwardly through said hollow tube, and means for rotating said spindle.

3. In a churn, the combination with a supporting base and a vessel mounted thereon, of an air inlet tube extending upwardly through the bottom of the vessel, a coping extending downwardly from the top of said tube and provided with a radially extending dasher with intervening air circulation space, a spindle extending upwardly through said air inlet tube and secured to said coping, and gearing for rotating said spindle, substantially as set forth.

4. In a churn, the combination with a supporting base and a vessel mounted thereon, of an air inlet tube extending upwardly through the bottom of the vessel, a coping extending downwardly from the top of said tube and provided with a radially extending dasher with intervening air circulation space, a spindle extending upwardly through said air inlet tube and secured to said coping, a gear wheel located centrally of the base and provided with a socket for the lower end of said spindle, and gearing for rotating said gear wheel, substantially as set forth.

5. The combination with a churning vessel having an air inlet tube extending upwardly through its bottom, of a tubular shell telescoping over the upper end of said tube with an intervening air circulation space provided with radially arranged dasher mechanism and air circulation apertures, a spindle secured to the upper end of said shell extending downwardly through said air tube, and an actuating gear for said spindle provided with a receiving socket for its terminal, substantially as set forth.

In testimony whereof I affix my signature in presence of two witnesses.

THADDEUS S. LEESE.

Witnesses:
C. M. CLARKE,
CHAS. S. LEPLEY.